United States Patent [19]

DeCamp et al.

[11] Patent Number: 4,920,254

[45] Date of Patent: Apr. 24, 1990

[54] ELECTRICALLY CONDUCTIVE WINDOW AND A METHOD FOR ITS MANUFACTURE

[75] Inventors: Howard S. DeCamp, Northridge; John A. Raffo, Simi Valley; Alex Z. Bimanand, Burbank, all of Calif.

[73] Assignee: Sierracin Corporation, Sylmar, Calif.

[21] Appl. No.: 158,579

[22] Filed: Feb. 22, 1988

[51] Int. Cl.$^5$ ............................................. B60L 1/02
[52] U.S. Cl. .................................. 219/547; 219/203;
219/464; 219/543; 219/544; 427/302; 427/314;
427/404; 427/407.2; 427/54.1
[58] Field of Search ............... 219/203, 345, 461, 464,
219/522, 542, 543, 544, 547, 546; 338/211, 217,
309, 322; 427/44, 54, 250, 301, 302, 314, 404,
407.1, 407.2; 428/38, 49

[56] References Cited

U.S. PATENT DOCUMENTS 4,069,364 1/1978 Dickie .................................. 427/44
4,552,932 11/1985 Schollenberger .................. 525/440
4,707,586 11/1987 Voss et al. .......................... 219/203

OTHER PUBLICATIONS

Fleischer, UV Coatings for Plastics; Fast Cures at Low Temperatures, *Plastics Engineering*, Sep. 1983, three pages.

Primary Examiner—B. A. Reynolds
Assistant Examiner—Leon K. Fuller
Attorney, Agent, or Firm—Christie, Parker & Hale

[57] ABSTRACT

A laminated window is prepared by applying an ultraviolet curable acrylate resin to a transparent rigid outer layer. The acrylate is carried in a solvent that swells a plastic surface of the outer layer to promote adhesion. After evaporating substantially all of the solvent the base coat is exposed to ultraviolet radiation to polymerize the acrylate. An electrically conductive metal layer is deposited on a portion of the base coat. When this is completed the window may be laminated with a conventional interlayer and rigid transparent inner layer.

23 Claims, 2 Drawing Sheets

ELECTRICALLY CONDUCTIVE WINDOW AND A METHOD FOR ITS MANUFACTURE

FIELD OF THE INVENTION

This invention relates to a transparent window including an electrically conductive layer over at least a portion of its area, and useful for providing electrical heating, anti-static shielding, radio frequency interference shielding, electromagnetic pulse shielding, and the like. Such a window is particularly suitable for aircraft windshields which have high performance and optical quality standards.

BACKGROUND OF THE INVENTION

In the past various laminated windshields, cockpit canopies, and other windows have been provided for aircraft. Such laminations can be made of rigid layers of glass or plastic, or combinations of glass and plastic sandwiched together by means of somewhat flexible interlayers such as polyurethane, polyvinyl butyral, silicone or the like. Most common plastics used are acrylates and polycarbonates.

Commonly such windshields are provided with electrically conductive circuit layers bonded between such glass and/or plastic layers. The circuits are used for electrically heating windows, draining static electricity from the surfaces, shielding from radio frequency interference, (RFI), electromagnetic interference (EMI), electromagnetic pulse (EMP), and the like.

One type of electrically conductive circuit layer provided in the past includes a thin film of conductive metal or metal oxide adhered on the inner surface of a rigid, outer windshield layer or face ply. Thin films of metal have also been deposited on thin plastic layers embedded in the laminated windshield for similar purposes. Another type of electrically conductive circuit layer employs a large number of more or less parallel sinuous metal wires embedded in the lamination.

Some disadvantages have been identified with respect to such electrically conductive circuit layers. The voltage and current relations required for electrical heating may be difficult to accommodate in some aircraft electrical systems. The total transparency of the window may be reduced in the case of a thin film conductive layer. A thin film layer may not be suitable on all substrates. For example, a transparent metal oxide thin layer is inappropriate for a plastic substrate. Fabrication of windows incorporating wire elements is costly and difficult because of the very small size wires required to maintain any semblance of optical quality. Further, thermal gradients created by heated wires embedded in a plastic interlayer away from the face ply of the window may result in gradients in index of refraction which can introduce blurring and distortion.

Another approach to providing a heater circuit on the surface of a glass panel in a window laminate is disclosed by Coale et al in U.S. Pat. No. 2,932,170. The electrical conductors disclosed by Coale, et al are applied to the glass surface by first masking the surface completely with a protective film. The pattern of the electrical conductors is then formed through the film by scribing or using photographic techniques to thereby expose only that portion of the glass that forms the desired conductor pattern. A metal such as silver, copper or gold is then applied to the exposed pattern on the glass surface by "conventional mirror-producing methods" or by vaporization. The protective film is then removed from remaining portions of the glass, leaving the conductive metal lines on the glass surface.

When a circuit that comprises electrically conductive lines is provided on a glass surface for heating a windshield that incorporates the circuit, it is important that the lines adhere to the surface. For example, if such lines do not adhere, non-uniform heating can result, which can distort vision through the windshield. Such vision distortion can be intolerable, for example, in aircraft windshields. Conductive lines that do not adhere well are also subject to damage in processing the face ply for incorporation in the window.

Although the disclosure of Coale, et al relates to forming electrically conductive lines on glass, aircraft windshields onto which such lines can be formed for use as a heater may be made entirely of plastic as a weight-saving measure.

A technique has been provided for forming a window having an electrically conductive circuit layer in U.S. patent application Ser. No. 529,975, filed September 7, 1983, which is a continuation-in-part of U.S. Patent application Ser. No. 262,494, filed May 11, 1981. Both of these applications are assigned to the assignee of this application and are hereby incorporated by reference.

These applications describe a method for forming a plurality of spaced apart electrically conductive metal film runs or lines on the surface of a transparent substrate to be used as the outer layer or face ply of a heatable window. The inner surface of the outer layer has a transparent base coat applied and a strike coat of electrically conductive metal is deposited onto the base coat. A portion of the metal strike coat is masked so that unmasked portions of the strike coat comprise the pattern of electrically conductive metal film runs to be formed. An electrically conductive metal is electroplated onto the unmasked portions of the strike coat. The mask and portions of the strike coat onto which no metal was electroplated are then removed to leave a plurality of spaced apart electrically conductive metal film runs on the inner surface of the outer window layer. Flexible "bus bars" of metal braid are applied as leads to make electrical contact with the lines. The outer layer is laminated with other layers to sandwich the electrically conductive circuit layer within the window.

A base coat described in the aforementioned applications comprises a co-polymer reaction product of a methacrylic acid ester and an organofunctional silane. Another base coat comprises a composition that includes a urea-formaldehyde compound, an epoxy resin, and an organo-functional silane. The former base coat is cured by immersion in weak acid solution for about one to four hours. The latter base coat is cured by heating at about 300° F. for about one to six hours.

The handling required until such a base coat can be cured affords an opportunity for particles and other contamination to adhere to the base coat and degrade the optical properties of the resultant window. It is also desirable to improve the reliability of adhesion between the base coat and strike coat. It is also desirable to provide a strike coat applicable to polycarbonate as well as acrylic substrates. It is desirable to improve the optical quality of the base coat for optimizing the optical quality of the composite window. For economy it is desirable that the base coat be applied easily, quickly, and reliably for economy of manufacture.

BRIEF SUMMARY OF THE INVENTION

There is, therefore, provided in practice of this invention according to a presently preferred embodiment a window including an electrically conductive layer on at least a portion of its area comprising a rigid outer layer of transparent material, a transparent base coat of ultraviolet cured acrylate material on the inner surface of the outer layer, a plurality of spaced apart electrically conductive metal film runs adhered to the base coat, and such other interlayers and other transparent layers as might be desired to complete the window.

Such a window is formed by coating a surface of the rigid transparent outer layer with a solution comprising a polymerizable acrylate resin and a solvent for the resin, the solvent being selected for swelling a surface layer of the outer layer in the event the substrate is plastic. Substantially all of the solvent is evaporated to leave a uniform base coat of polymerizable acrylate resin on the outer layer. This base coat is then exposed to sufficient ultraviolet radiation to crosslink the acrylate resin. An electrically conductive metal layer can be deposited on the cured base coat with high adhesion and reliability.

BRIEF DESCRIPTION OF THE DRAWINGS

These and other features, aspects and advantages of the present invention will be more fully appreciated when considered in connection with the following detailed description and accompanying drawings wherein.

DETAILED DESCRIPTION

Figure 1:
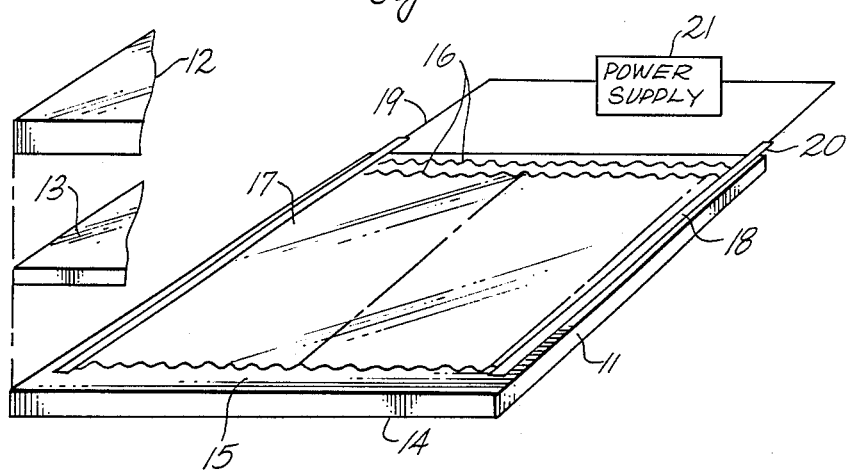
FIG. 1 is a semi-schematic exploded isometric view of an exemplary window incorporating an electrically conductive circuit layer in practice of principles of this invention.
Figure 2:
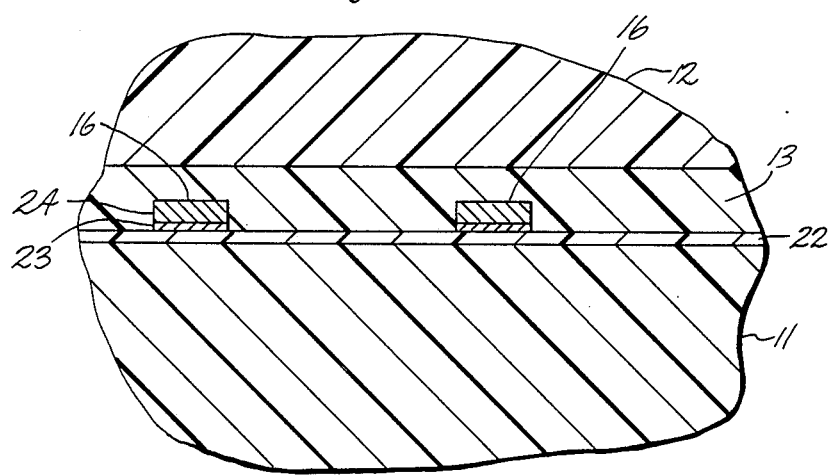
FIG. 2 is a semi-schematic fragmentary cross section of a portion of such a window as illustrated in FIG. 1.
Figure 3:
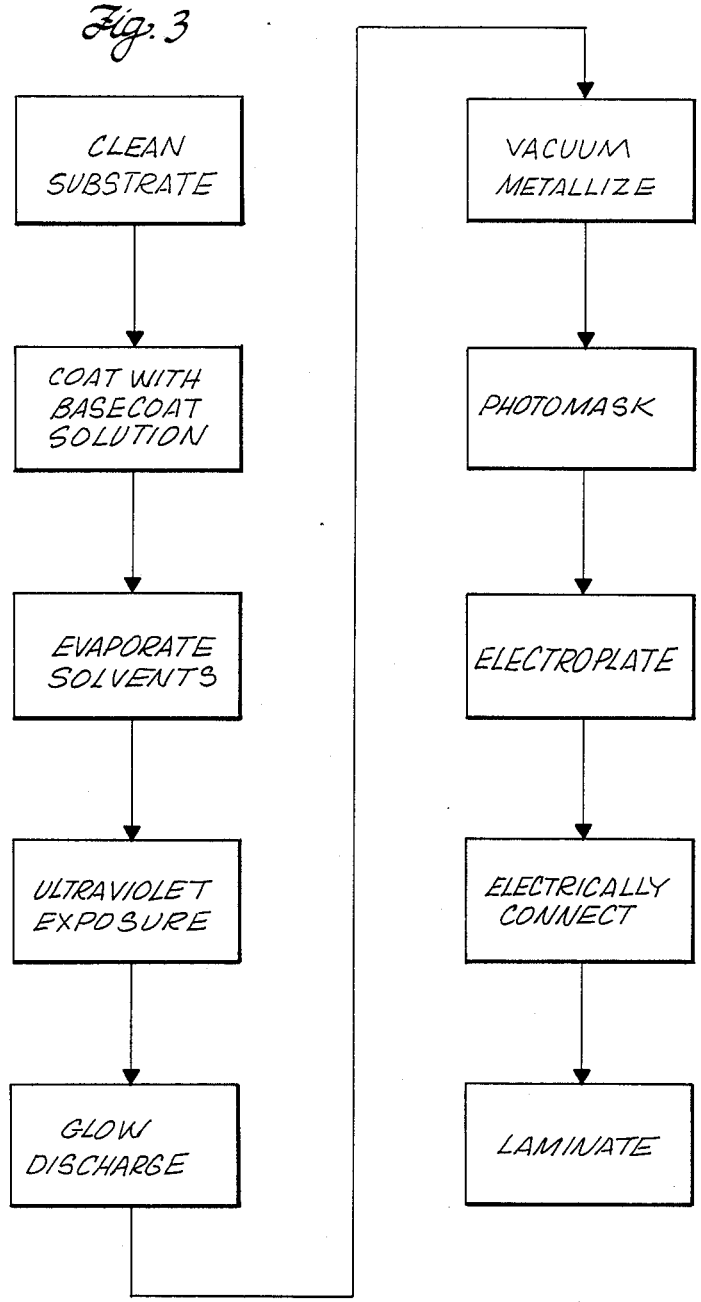
FIG. 3 is a block diagram showing some of the successive process steps employed in practice of this invention for producing a window including an electrically conductive circuit layer.

In an exemplary embodiment of window or windshield constructed according to principles of this invention, as shown in FIGS. 1 and 2, there is a rigid outer layer 11, a rigid inner layer 12, and an intermediate flexible interlayer 13. Each of these layers is formed of a transparent material of high optical quality and with mechanical, physical and chemical properties suitable for a particular application. For example, the rigid outer and inner layers may be composed of glass or plastic. Exemplary plastics include polycarbonate and acrylates such as methyl methacrylate. The inner and outer layers may be the same or different materials. The interlayer 13 may be composed of polyvinyl butyral, silicone, or a polyurethane composition. The materials employed for the inner and outer layers and the interlayer are conventional, commercially available products and readily selected for service in a particular application by those skilled in the window lamination art.

The outer layer 11 has an outer or exterior major surface 14 and an inner major surface 15 on opposed faces thereof. In service the outer surface of the outer layer would be the weather side of the window. The inner major surface 15 carries a plurality of electrically conductive metal runs 16 arranged in spaced apart relationship, typically in a sinuous pattern. The opposite ends of each of the electrically conductive metal runs terminate in attachment elements (not shown) along opposite margins of the inner major surface 15. An exemplary attachment element comprises an enlarged metal deposited area at the end of the run. Wire braid strips or bus bars 17 and 18 extend transversely across the respective attachment elements on the electrically conductive runs and are suitably secured thereto by a conventional electrically conductive adhesive such as silver loaded epoxy resin or solder. Ends of the bus bars 17 and 18 are attached to conventional terminal leads or connections 19 and 20 so that attachment can be made to a suitable power supply 21, current drain, or other external electrical connection as appropriate for the application intended for the window.

It will be recognized that FIG. 1 is an exploded view with the inner layer 12 and interlayer 13 exploded from the rigid outer layer or face ply 11. In the laminated window these layers tightly adhere together. Such tight assembly is illustrated in the fragmentary cross section of FIG. 2.

It will be apparent that neither of these figures is drawn to scale since a semi-schematic illustration is appropriate for acquiring an understanding of this invention. For example, the width, thickness and spacing between adjacent metal runs 16 in FIG. 2 have little relation to an actual embodiment. Such embodiments are described in the aforementioned patent applications. For example, a run for a heater grid may be 13 microns wide and adjacent runs may be more than 250 microns apart. Exemplary thickness is from 2 to 15 microns. Preferably the line or run width is in the range of from 5 to 50 microns and most preferably in the range of from 5 to 20 microns.

In an exemplary embodiment for a heater, each of the runs extends continuously between the bus bars in a sinuous path. The wavelength of the path is about one-half millimeter and the amplitude is about 90 microns.

For another example, a run for an electromagnetic pulse or interference screen may be 50 microns wide and adjacent runs may be 1.3 mm apart. Exemplary thickness is form 15 to 40 microns. Preferably the runs occult up to five percent or less of the transparent area in which the runs are located.

The laminated window comprises a base coat 22 applied to the outer layer 11 before deposition of the electrically conductive circuit elements 16. In an exemplary embodiment the base coat has a thickness in the range of from 10 to 15 microns. As will be apparent hereinafter each of the electrically conductive metal runs 16 comprises a strike coat 23 in the range of from 0.1 to 0.3 microns thick with the balance of the thickness comprising electrodeposited metal 24. The base coats provided in practice of this invention adhere extremely well to their respective substrates. Further, the base coats enhance the adherence of the electrically conductive metal runs to the outer layer of the window.

Each of the base coats provided in practice of this invention comprises an ultraviolet cured, cross-linked acrylate composition. Such a material has sufficient flexibility to withstand stress due to heating of the metal runs. It has outstanding adhesion, cures rapidly with little energy consumption, is free of haze and has excellent abrasion, solvent and humidity resistance.

The composition comprises an amino acrylate having the formula:

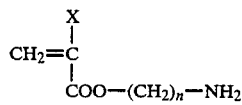

wherein n is in the range of from 1 to 10, and X is hydrogen or methyl. The preferred compound is 2-aminoethyl methacrylate, that is, where n=2 and X is CH$_3$. The amino acrylates are desirable since they promote adhesion to the substrate, and also adhesion of overlying materials to the base coat. The alpha hydrogen of the amine group may also act as a co-initiator of ultraviolet polymerization with an ultraviolet absorber such as benzophenone or the like.

Preferably the composition also comprises other acrylate compounds for obtaining desired properties in the base coat. Generally speaking, the amino acrylates are not polyfunctional and additional polyfunctional acrylates are employed for cross-linking. Other acrylates may be included for hardening the cured polymer, increasing solvent resistance and the like. Examples of suitable mono- and multi-functional acrylates include 2-phenoxyethyl acrylate, isobornyl acrylate, cyclohexyl acrylate, polyethylene glycol dimethacrylate, polyethylene glycol diacrylate, 1,6-hexanediol diacrylate, tripropylene glycol diacrylate, trimethylolpropane triacrylate, and the like.

Satisfactory base coats are obtained when the aminoacrylate or aminomethacrylate is present in the range of from 5 to 75% by weight and the other acrylates or methacrylates are present in the range of from 25 to 95%. Preferably the aminoacrylate or aminomethacrylate is present in the range of 40 to 50% by weight. These proportions are stated without consideration for other solids in the base coat forming composition.

In addition to the polyfunctional acrylates, cross-linkers useful in practice of this invention are divinyl or polyvinyl compounds such as divinyl benzene, N,N-methylene-bis-acrylamide, allyl diglycol carbonate, or the like.

A free radical producing photoinitiator or photo-sensitizer for acrylate resin is also incorporated in the coating in a concentration of 0.1 to 10%, preferably up to 5%, based on the weight of solids. Free radical generation by UV absorbing photoinitiators or photosensitizers is believed to occur by two basic mechanisms: Initiation through free radicals produced from a photochemically excited molecule by a process in which the initiator itself is consumed. In this case, the reactive species may be produced by homolytic cleavage-decomposition of the excited molecule or from hydrogen abstraction by the initiator. Alternatively, initiator radicals may be produced by transferring the energy absorbed by the photochemically excited sensitizer to another molecule which, in turn, can dissociate or disgenerate into reactive species. The initial absorber, in this instance, is a photosensitizer. Some examples of these UV radiation photosensitizers and photoinitiators include benzophenone, acetophenone, dimethoxy phenyl acetophenone, benzil, benzilmethyl ketone, benzoin methyl ether, benzoin isopropyl ether, phenyl glyoxal, and the like. The photoinitiator may also include a synergistic agent, such as a tertiary amine, to enhance the conversion of absorbed energy to polymerization initiating free radicals. The amino-acrylates may act as coinitiators of such polymerization.

Suitable photoinitiators also include carbonyl compounds such as diacetyl; organic sulfur compounds such as alkyl disulfides, aryl disulfides, aroyl disulfides, acyl disulfides, cycloalkyl disulfides, and mercaptans; peroxides and hydroperoxides; redox systems such as hydrogen peroxide-ferrous ion; azo and diazo compounds; certain halogen compounds such as 1-chloromethyl-naphthalene, and phenyl bromide; photoreducible dyes which in the presence of a reducing agent such as stannous chloride or ascorbic acid give a lenco derivative able to react with oxygen to produce free radicals.

The photoinitiator in the composition decomposes upon exposure to ultraviolet radiation, producing free radicals which promote crosslinking. Less than all of the photoinitiator may be reacted in the course of completely curing the acrylate. Thus, at the end of polymerization, a small amount of photoinitiator may remain in the composition. In some cases this may be as much as 30% of the beginning amount of the initiator. Some excess initiator is desirable to assure that maximum crosslinking of the acrylate is obtained.

Thus, when the base coat is cured, it comprises principally cross-linked transparent acrylate. It also contains photoinitiator in the range from trace up to 3%. Preferably photoinitiator is present in the cured composition in the range of from 0.3 to 1.5% by weight. Other residual acrylate monomers or oligomers may be present in the cured composition.

The base coat is applied to the substrate in a solvent. The solvent carries the solid resins, photo-initiators and adjuvants which improve the properties of the coating or the solution used to apply the coating. To aid mixing of ingredients and promote uniform application of the composition to the substrate, a blend of solvents may be included in the formulation. In exemplary embodiments the solvent is present in the order of 80% and the solution has about 20% solids. Solids content preferably is in the range of from 10 to 25 percent. The solution is applied to the substrate and the solvent evaporated, leaving a layer of deposited solids. The resins in the layer are then exposed to ultraviolet to initiate polymerization.

When coating an acrylic substrate such as a polymethyl methacrylate sheet for forming the outer layer of the window, the ultraviolet curable acrylate is applied to the substrate in a solvent or blend of solvents which swells the substrate. Such a solvent apparently diffuses into the substrate, and it is uncertain whether it actually dissolves some of the substrate material. The swelling enhances the adhesion of the base coat on the substrate, probably by mechanically carrying the UV curable acrylates into the substrate.

When coating a transparent acrylic substrate, such as methyl methacrylate, a suitable solvent for carrying the ultraviolet curable acrylate precursor and swelling the substrate comprises lower alkyl acetates having from four to six carbon atoms such as ethylacetate, propyl acetate, butyl acetate, isobutyl acetate, alkyl ketones having from three to seven carbon atoms such as methyl ethyl ketone, methyl isobutyl ketone and methyl isoamyl ketone, ether esters of ethylene or propylene glycol such as esters of ethylene or propylene glycol such as CH$_3$COO(CH$_2$CH$_2$O)$_2$CH$_5$, CH$_3$COO(CH$_2$CH$_2$O)$_2$C$_4$H$_9$, CH$_3$COOCH$_2$CH$_2$OC$_2$H$_5$, CH$_3$COOCH$_2$CH$_2$OCH$_3$, and CH$_3$COOCH$_2$CH$_2$OC$_4$H$_9$ and analogs of such materials prepared from propylene glycol, and aromatic solvents such as toluene and xylene. Propyl acetate and butyl acetate are particularly desirable since their vapor pressure promotes air drying in ten minutes or less without evaporating so rapidly as to cause moisture condensation or poor flow characteristics. Alcohols which evaporate from the substrate at roughly the same rate as the above mentioned materials, may also be used for moderating the action of the solvent on the substrate. Examples include n-propanol, n-butanol, isopropanol iso-propanol, iso-butanol, 2-ethoxyethanol, and the like. It will be recognized that a blend of solvents is desirable and evaporation of the blend differs from evaporation rate of the individual solvents making up the blend.

When coating a polycarbonate substrate a suitable solution contains from 10 to 25% solids and preferably about 20% by weight of solids. The acetates, esters, ketones and aromatic solvents are too aggressive to apply in concentrated form to polycarbonate. Suitable solvents for applying a base coat to polycarbonate include lower aliphatic alcohols having from one to four carbon atoms such as methanol, ethanol, n-propanol, n-butanol, isopropanol, iso-butanol, and lower alkyl ethers of ethylene or propylene glycols such as 2-methoxyethanol, 2-ethoxyethanol, 2-butoxyethanol and propylene glycol methyl ether. Up to about 10% of aggressive solvents such as acetates and ketones may be added for applying a base coat to polycarbonate to promote swelling of the polycarbonate substrate. A typical solution for applying a base coat to polycarbonate has 3 to 5% propyl acetate, 15% propyl alcohol and the balance of anhydrous ethyl alcohol. Avoidance of water in the solutions is desirable to minimize haze.

It is also desirable to include in the base coating solution a small amount of surfactant or flow control agent to promote wetting of the substrate. Exemplary flow control agents include FC-430, a fluorinated compound available from 3M Company, St. Paul, Minnesota, and DC-190 and DC-193, silicone compounds available from Dow Corning, Midland, Michigan. The amount of flow control agent in the solution may be in the range of from 0.01 to 1% by weight based on the solids content of the solution. About 0.3% by weight is preferred.

It may also be desirable to include a high molecular weight (for example, about 70,000) cellulosic polymer in the base coat composition. The presence of different functionalities in the cellulose derivatives enhance the film forming characteristics of the base coat and also serve as flow control agents. Such materials may be included up to 5% based on the weight of solids.

Another ingredient useful in practice of this invention comprises moderately high molecular weight (for example, about 10,000) acrylic polymers for much the same reasons the cellulosic polymers may be included. Functionality of such polymers helps promote adhesion, particularly on acrylic substrates. Such acrylic polymers may be included up to 5% based on the weight of solids.

It will be apparent that other adjuvants may be included in the composition for promoting smooth deposition of the base coat on a substrate, ultraviolet polymerization of the resins, adhesion of the base coat, or modifying of the resins, adhesion of the base coat, or modifying other properties of the cured base coat. For example, one may include an anti-oxidant to avoid inhibition of the ultraviolet curing by atmospheric oxygen and to enhance shelf life of the solutions. Examples of such inhibitors include sterically hindered phenols supplied by Ciba-Geigy under the trademarks Irganox 1076 and Irganox 1010. The antioxidant may be present in amounts up to 300 PPM based on the solids content of the solution. Organo-silane compounds may be included when a glass substrate is coated for promoting adhesion of the base coat on the substrate. Other additives will be apparent to one skilled in the art.

EXEMPLARY COMPOSITIONS

An exemplary composition for applying an ultraviolet curable base coat to a methyl methacrylate substrate comprises:

| EXAMPLE A | |
|---|---|
| | Parts |
| 2-aminoethyl methacrylate | 8 |
| iso-bornyl acrylate | 2 |
| tripropylene glycol diacrylate | 4 |
| trimethylol propane triacrylate | 6 |
| Acryloid B-48N | 1 |
| Darocur 1173 | 0.6 |
| propyl acetate | 15 |
| butyl acetate | 15 |
| propylene glycol methyl ether acetate | 10 |
| methyl amyl ketone | 20 |
| n-butanol | 10 |
| n-propanol | 10 |
| DC-190 | 0.03 |

Acryloid B-48N is an acrylic polymer having a molecular weight in the order of 8,000 to 12,000 available from Rohm & Haas Company, Philadelphia, Pennsylvania. Darocure 1173 is 2-hydroxy-2-methyl-1-phenylpropane-1-one. DC-190 is a silicone flow control agent from Dow Chemical, Midland, Michigan.

An exemplary composition for applying an ultraviolet curable base coat to a polycarbonate substrate comprises:

| EXAMPLE B | |
|---|---|
| | Parts |
| 2-aminoethyl methacrylate | 10 |
| 2-phenoxyethyl acrylate | 2 |
| 1,6-hexanediol diacrylate | 3 |
| trimethylolpropane triacrylate | 5 |
| cellulose acetate butyrate, MW 70,000 | 0.2 |
| Irgacure 184 | 0.6 |
| butyl acetate | 8 |
| propylene glycol methyl ether | 25 |
| n-butanol | 20 |
| n-propanol | 27 |
| DC-193 | 0.03 |

Irgacure 184 is hydroxycyclohexylphenylketone from Ciba-Geigy, Greensboro, North Carolina. DC-193 is a silicone flow control agent from Dow Corning, Midland, Michigan. The cellulose acetate buyrate polymer has a molecular weight of about 70,000.

An exemplary composition for applying an ultraviolet curable base coat to a glass substrate comprises:

| EXAMPLE C | |
|---|---|
| | Parts |
| 2-aminoethyl methacrylate | 8 |
| cyclohexyl acrylate | 2 |
| tripropylene glycol diacrylate | 3 |
| 3-methacryloxypropyltrimethoxysilane | 1 |
| trimethylol propane triacrylate | 6 |
| Benzophenone | 0.6 |
| propyl acetate | 15 |
| butyl acetate | 15 |
| propylene glycol methyl ether acetate | 10 |

| -continued EXAMPLE C | |
|---|---|
| | Parts |
| methyl amyl ketone | 10 |
| n-butanol | 15 |
| n-propanol | 15 |
| DC-193 | 0.03 |

The composition for coating a glass substrate includes an organosilane for enhanced adhesion to the inorganic substrate. The organosilane essentially forms a bridge between the inorganic glass substrate which is compatible with the silane moiety of the molecule, and the organic acrylate resin which is compatible with the organic moiety of the molecule. It is also desirable to prime the surface of the glass with a prehydrolyzed organosilane for enhancing adhesion. A variety of conventional organosilanes are suitable such as 3-aminopropyltriethoxysilane, N-(2-aminoethyl-3-aminopropyl)trimethoxysilane, and the like.

PROCESSING

An initial step in a process for producing a window with an electrically conductive circuit layer comprises cleaning the surface of the substrate selected to form the outer layer of the window. An exemplary outer layer comprises a commercially available aircraft window grade acrylic. The surface of the acrylic sheet to receive the base coat is thoroughly cleaned by rubbing the surface with a lint-free wipe and an excess of naphtha. This is followed by wiping twice with an excess of isopropyl alcohol. Finally, the surface is blown dry to remove any traces of lint. Such cleaning is employed even on acrylic sheets received with the conventional protective film or paper.

The surface of the sheet is then flow coated with a base coat solution. This is done manually by flooding the entire surface with an excess of the base coat solution to assure a thoroughly clean surface and assure that the entire surface is wetted. The surface is immediately uniformly coated by slowly sweeping a stream of solution back and forth across a vertically suspended sheet with gravity draining of the solution at the lower edge of the sheet. Such flow coating of a conventional four by eight foot (1.22×2.44 meters) acrylic sheet can be accomplished in about one minute.

The proportions of materials in the base coating solution for the best quality flow coating are dependent on a variety of parameters, including the skill of the operator doing the flow coating. The uniformity of the coating is a complex function of not only this skill but the viscosity of the precursor solution, the polarity of the substrate surface and the materials in the solution, surface energies of the solid and liquid interfaces, temperature, solvent evaporation and the like. Some experimentation to determine the optimum parameters to obtain a uniform coating of a desired thickness is routine.

Generally speaking the solids content of ultraviolet curable acrylate in the solution is in the range of from 10 to 25% by weight. Suitable viscosity is in the range of from 10 to 30 centipoise. A uniform base coat six to eight microns thick can be produced on an acrylic substrate with a propyl acetate solution containing about 15% by weight ultraviolet curable acrylate and a viscosity of about 20 centipoise. Various other suitable parameters can be readily determined for a variety of ultraviolet curable acrylates, substrates, solvents, etc.

The flow coated sheet is then air dried for a sufficient time for substantially all of the solvents in the coating solution to evaporate from the thin film remaining on the surface. Five to ten minutes is sufficient for solutions provided in practice of this invention. The air dried, uncured acrylate base coat remains tacky.

The acrylate base coat is exposed to long wavelength ultraviolet which produces free radicals and induced additional polymerization of vinyl bonds. Radiation is suitably in the wavelength range of 200 to 750 nanometers, preferably 200 to 400 nanometers. Any suitable source which emits ultraviolet light, such as carbon arc lamps, xenon mercury vapor lamps, or tungsten halide lamps may be used for curing the composition. Particularly preferred are ultraviolet emitting lamps of the medium pressure mercury vapor type. Such a lamp has somewhat broadened peaks at 250 and 350 nanometers. Curing with ultraviolet radiation of about 350 nanometers is preferred to assure that the radiation penetrates sufficiently deeply into the base coat and is sufficiently energetic to activate polymerization of the acrylate through the entire thickness of the base coat. If the peak ultraviolet radiation is much less than about 200 nanometers or much more than about 400 manometers, the acrylate may not cure properly.

The intensity of the ultraviolet radiation at the base coat surface is preferably in the range of from 200 to 250 milliwatts per square centimeter. Too low an intensity may not effect sufficient polymerization. Too high an intensity may accelerate the polymerization so rapidly that relatively high residual stresses remain. To minimize such residual stress, pulse-like exposure of the base coat to ultraviolet radiation is preferred. For example, the base coat may be illuminated by a band of ultraviolet radiation about 30 centimeters wide and traversed through the band at a rate of about 35 centimeters per second to initiate polymerization and largely eliminate any tackiness. Final curing can then be effected with three more passes through the band of ultraviolet radiation at a rate of about 20 centimeters per second.

The flow coating, air drying and ultraviolet curing can all be conducted without removing the sheet from the clean room in which such operations are conducted. These operations can be concluded in 12 to 15 minutes as compared with a few hours for the prior window base coats.

It is important that the environment be controlled for the flow coating, air drying, and ultraviolet exposure steps of the process to assure the best possible optical quality. The operations should be conducted in a clean room so as to be substantially free of dust particles which could cause optical aberrations. The flow coating solutions are passed through a one micron filter immediately before application to the surface to remove any particles from that source.

The temperature in the room should be maintained in the range of from 60° to 65° F. (15.5° to 18.3° C.) to obtain acceptable optical quality. If the temperature is much below 60° F. the solvents evaporate from the base coat layer too slowly. This may permit undesired flow in the coating or leave it tacky a sufficient time to collect dust particles. Low temperatures may inhibit breakage of tiny bubbles in the coating flowed on the surface and flow lines may show. Such flow lines, bubbles, dust particles, and the like are optical aberrations that may not be acceptable in a completed window.

If the temperature in the room is much above 65° F. the solvents in the base coat layer evaporate too rapidly and the coat will not properly "level" to have uniform thickness. Breakage of tiny bubbles in the flow coating solution may also be inhibited. Such effects can produce unacceptable optical irregularities.

It is also important to maintain a low relative humidity. Preferably the humidity is maintained in the range of from 35 to 45%. It becomes costly to reduce the relative humidity below about 35% and further reduction is not found to be needed. Further, it is desirable not to reduce the relative humidity to less than 30% since static electricity charges on the surface may attract dust particles. The relative humidity should be less than 45% to maintain good optical quality. If the relative humidity is much above 45% haze may be produced in the base coat and an "orange peel" surface may occur, which is optically unacceptable. It is believed that haze and orange peel occur due to slight condensation of water vapor at the base coat layer which is cooled by solvent evaporation below the dew point. A relative humidity of up to 50% can be acceptable for the base coat solution described herein for coating polycarbonate.

After curing the base coat, a strike coat of copper is vacuum deposited on the base coat surface. For this step of the process, the surface is cleaned by solvent washing and the like, which is routine practice regardless of the substrate to receive a vacuum deposited coating. Ordinarily for vacuum deposition the surface is given a final cleaning by glow discharge in a very low pressure oxygen environment. It is found in practice of this invention that such glow discharge can be omitted when the base coat is on a plastic substrate. It also may be feasible to omit glow discharge when the base coat is on a glass substrate. This further reduces processing time and cost as compared with prior base coats.

The ultraviolet cured acrylate base coat then receives a very thin vacuum deposited tie coat comprising about 80% nickel and 20% chromium. This is followed by vacuum deposition of a metal strike coat such as copper having a uniform thickness of from 1000 to 3000 angstroms. The tie coat may be omitted in some embodiments.

The next steps in the process comprise application, exposure and development of a photoresist over the strike coat. These conventional steps, as described in the aforementioned patent applications, result in selected masking of some areas of the strike coat. The unmasked areas of the strike coat are exposed for receiving an electroplated layer of copper to form the electrically conductive runs or lines of the circuit layer. Conventional copper electroplating parameters may be used.

After electroplating the remaining photoresist is removed from the masked areas. The window is then etched to remove the strike coat between the runs, which also removes some metal from the runs themselves. If desired, the surfaces of the runs can be chemically blackened for decreased visibility. Preferably the completed runs have a thickness in the range of from about 2 to 15 microns. The width and thickness of the runs are selected along with the geometric pattern and length to provide the desired electric properties for a given application. For example, different thicknesses can be used for high voltage electrostatic drains as compared with thinner layers for electrical heaters.

Electrical connections can then be made to the ends of the runs by attaching metal braid bus bars with a conductive adhesive, solder or the like. A window can be treated by laminating the outer layer with its deposited electrically conducted circuit layer, a somewhat flexible interlayer and a rigid interlayer. If desired, additional layers may also be laminated in the window.

The ultraviolet curable acrylate not only provides much faster, easier processing than prior base coats, it also produces a better result. Adhesion to the substrate is improved, for example. One method of measuring adhesion is according to ASTM test D3359-78. In this test an X-shaped cut is made through the base coat film and pressure sensitive tape is applied over the cut and removed. With the prior silane base coat many samples have no peeling or removal and be rated as 5 on the 0 to 5 scale provided by this test. However, it was never possible to produce 100% samples having this high adhesion and occasional samples would fail the test. By contrast, with the ultraviolet cured acrylates 100% reliability has been obtained. That is, all of the samples pass the tape adhesion test.

The ultraviolet cured acrylate base coats also appear to be totally resistant to deterioration by high relative humidity. For example, samples have been maintained at 100% relative humidity at 109° F. for a period of three months. Even after such exposure all of the samples passed the tape adhesion test, no optical haze is produced, and the surfaces remain solvent resistant and abrasion resistant. No detectable changes occurred in the ultraviolet cured acrylate base coats subjected to the humidity test.

Two types of abrasion-resistance tests have been performed on the ultraviolet cured acrylate base coats with excellent results. After one hundred cycles at 500 grams load in ASTM test D-1044-82, the ultraviolet cured acrylate base coat has from 2 to 18% haze. Bare acrylic suitable for aircraft windows has a haze of about 33%. Bare polycarbonate has a haze of 45 to 50%.

Another abrasion-resistance test is ASTM test F-735. In this test ultraviolet curable acrylate base coats show a haze of from 10 to 20% after 600 strokes. By comparison bare acrylate shows a haze of about 35% and bare polycarbonate shows a haze of about 75%.

Ultraviolet cured acrylate base coats as provided in practice of this invention are advantageous because of the range of materials on which the base coat can be applied. The base coat can be used on aircraft window grade acrylate and polycarbonate plastics. The silane base coat described in the aforementioned patent applications cannot be used at all on polycarbonates since it does not result in a transparent window. The ultraviolet cured base coat can also be used on glass or polyethylene terephthalate (PET) substrates. The base coat may be applied directly to such a substrate or, particularly in the case of glass, a thin primer coat of acrylate may first be deposited on the glass.

An embodiment is specifically described herein with more or less parallel wavy lines or runs between bus bars at opposite edges of a window. Many other arrangements of electrically conductive runs can be employed to form a circuit layer in a window. For example, where electromagnetic pulse or electromagnetic interference shielding is desired a three dimensional grid of "crossing" lines can be formed on the base coat. Such an array is more isotropic in its electrical properties than the parallel lines described with respect to the window illustrated in FIG. 1. A base coat as provided in practice of this invention may also be useful when a metal coating sufficiently thin to be transparent is applied over a large area of the window. It will be apparent that principles of this invention may be employed for windows having a broad variety of electrically conductive layers useful for a broad variety of purposes.

Although described as ultraviolet curable, such acrylates as described herein may also be cured with electron beam irradiation. Many other modifications and variations will be apparent to one skilled in the art. It is therefore to be understood that within the scope of the appended claims the invention may be practiced otherwise than as specifically described.

What is claimed is:

1. A method for forming a window including an electrically conductive layer on at least a portion of its surface comprising:
   selecting a rigid transparent substrate;
   coating a surface of the substrate with a solution comprising an ultraviolet polymerizable acrylate resin and a solvent for the resin;
   evaporating substantially all of the solvent to leave a base coat of polymerizable acrylate resin on the substrate;
   exposing the base coat to sufficient ultraviolet radiation to polymerize the acrylate, said coating through polymerizing steps being conducted in an environment at a temperature in the range of from 60° to 65° F. and at a relative humidity in the range of from 30 to 50%; and
   depositing an electrically conductive metal layer on at least a portion of the base coat.

2. A method as recited in claim 1 wherein the substrate comprises a material selected from the group consisting of acrylic and polycarbonate, and the solvent swells a surface layer of the substrate.

3. A method as recited in claim 1 wherein the substrate comprises an acrylate polymer and the solvent comprises an alkyl acetate.

4. A method as recited in claim 3 wherein the solvent comprises an acetate selected from the group consisting of ethyl acetate, propyl acetate and butyl acetate.

5. A method as recited in claim 1 wherein the substrate comprises a polycarbonate and the solvent comprises a major portion of a vaporizable alcohol and a minor portion of a vaporizable acetate.

6. A method as recited in claim 1 wherein the ultraviolet has a wavelength peak in the range of from 200 to 400 nanometers.

7. A method as recited in claim 1 wherein the intensity of the ultraviolet is about 200 milliwatts per square centimeter.

8. A method as recited in claim 1 wherein the ultraviolet is applied as a plurality of spaced apart pulses.

9. A method as recited in claim 1 wherein the acrylate resin comprises an aminoacrylate or aminomethacrylate in the range of from 5 to 75% by weight and an acrylate or methacrylate in the range of from 25 to 95% by weight.

10. A method for forming a window including an electrically conductive layer on at least a portion of its area comprising:
    coating a surface of a rigid transparent substrate with a solution comprising a polymerizable acrylate resin comprises a mixture of aminoacrylate resin and acrylate resin wherein the aminoacrylate resin is present in the range of from 5 to 75% of the total acrylate in the mixture, an ultraviolet activated photoinitiator for polymerization of the resin, and a solvent for the resin and photoinitiator;
    evaporating substantially all of the solvent to leave a base coat of polymerizable acrylate resin and photoinitiator on the substrate;
    exposing the base coat to sufficient ultraviolet radiation to polymerize the acrylate; and
    depositing an electrically conductive metal layer on at least a portion of the polymerized base coat.

11. A method as recited in claim 10 wherein the photoinitiator is present in the solution in the range of from 1 to 5% by weight.

12. A method as recited in claim 11 wherein the acrylate is present in the solution in the range of from 5 to 60% by weight.

13. A method as recited in claim 10 wherein the solvent is selected to evaporate substantially completely from a film of solution on the substrate at a temperature in the range of from 60° to 65° F. in the order of ten minutes.

14. A method as recited in claim 10 wherein the substrate comprises a material selected from the group consisting of acrylic and polycarbonate, and the solvent swells a surface layer of the substrate.

15. A method as recited in claim 10 wherein the solution comprises a film forming agent selected from the group consisting of cellulosic derivative polymers and acrylic polymers.

16. A method for forming a window including an electrically conductive layer on at least a portion of its area comprising:
    coating a surface of a rigid transparent substrate comprising a polycarbonate with a solution comprising a polymerizable acrylate resin, an ultraviolet activated photoinitiator for polymerization of the resin, and a solvent for the resin and photoinitiator comprising volatile alcohols and up to ten percent by weight of aggressive solvent selected from the group consisting of acetates and ketones;
    evaporating substantially all of the solvent to leave a base coat of polymerizable acrylate resin and photoinitiator on the substrate;
    exposing the base coat to sufficient ultraviolet radiation to polymerize the acrylate; and
    depositing an electrically conductive metal layer on at least a portion of the polymerized base coat.

17. A laminated window including an electrically conductive layer on at least a portion of an interior surface comprising:
    an outer layer of rigid transparent material having an inner major surface;
    a transparent base coat of ultraviolet cured acrylate polymer on the inner major surface of the outer layer wherein the acrylate polymer comprises a mixture of aminoacrylate and acrylate wherein the aminoacrylate is present in the range of from 5 to 75% of the total acrylate polymer in the mixture;
    a plurality of electrically conductive deposited metal runs adhered to the base coat;
    metal leads for making electrical contact with the runs; and
    a transparent layer over the runs.

18. A laminated window as recited in claim 17 wherein the base coat comprises a photoinitiator in the range of from a trace to 3% by weight.

19. A laminated window as recited in claim 17 wherein the conductive layer comprises runs of deposited metal from 5 to 50 microns wide and spaced apart to occult up to 5% of the transparent area in which the runs are located.

20. A laminated window including an electrically conductive layer on at least a portion of its surface comprising:
- a rigid transparent outer layer;
- a transparent base coat on an inner face of the outer layer consisting essentially of a cross-linked acrylate polymer comprising a mixture of aminoacrylate and acrylate wherein the aminoacrylate is present in the range of from 5 to 75% of the total acrylate polymer in the mixture, and a photoinitiator for the acrylate polymer in the range of from a trace to 3% by weight;
- an electrically conductive layer deposited on at least a portion of the area of the base coat;
- metal leads for making electrical contact with the runs;
- a transparent interlayer adhering to the base coat and to the conductive layer; and
- a rigid transparent inner layer.

21. A laminated window as recited in claim 20 wherein the base coat comprises a flow control agent in the range of up to 5% by weight.

22. A laminated window as recited in claim 20 wherein the base coat comprises a film forming agent selected from the group consisting of cellulosic derivative polymers and acrylic polymers.

23. A method for forming a window including an electrically conductive layer on at least a portion of its surface comprising:
- selecting a rigid transparent substrate;
- coating a surface of the substrate with a solution comprising an ultraviolet polymerizable acrylate resin comprising an aminoacrylate or aminomethacrylate in the range of from 5 to 75% by weight and an acrylate or methacrylate in the range of from 25 to 95% by weight and a solvent for the resin;
- evaporating substantially all of the solvent to leave a base coat of polymerizable acrylate resin on the substrate;
- exposing the base coat to sufficient ultraviolet radiation to polymerize the acrylate; and
- depositing an electrically conductive metal layer on at least a portion of the base coat.

* * * * *